United States Patent
Shemer et al.

(10) Patent No.: US 12,117,919 B2
(45) Date of Patent: Oct. 15, 2024

(54) GLOBAL AUTOMATED DATA CENTER EXPANSION

(71) Applicant: EMC IP Holding Company LLC, Hopkinton, MA (US)

(72) Inventors: Jehuda Shemer, Kfar Saba (IL); Valerie Lotosh, Ramat-Gan (IL); Erez Sharvit, Ramat-Gan (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 404 days.

(21) Appl. No.: 17/508,563

(22) Filed: Oct. 22, 2021

(65) Prior Publication Data
US 2023/0132476 A1     May 4, 2023

(51) Int. Cl.
*G06F 11/34*     (2006.01)
*G06F 9/50*     (2006.01)
*H04L 41/5009*     (2022.01)

(52) U.S. Cl.
CPC ........ *G06F 11/3442* (2013.01); *G06F 9/5027* (2013.01); *G06F 9/5077* (2013.01); *H04L 41/5009* (2013.01); *G06F 2209/5019* (2013.01)

(58) Field of Classification Search
CPC ............. G06F 11/3442; G06F 11/3466; G06F 9/5027; G06F 9/5038; G06F 9/5044; G06F 9/505; G06F 9/5077; G06F 2209/5019; H04L 41/5009
See application file for complete search history.

(56) References Cited

U.S. PATENT DOCUMENTS

| | | | |
|---|---|---|---|
| 10,250,455 B1* | 4/2019 | Moniz | H04L 41/5045 |
| 11,388,835 B1* | 7/2022 | Bryan | H05K 7/1498 |
| 2015/0200872 A1* | 7/2015 | Huang | H04L 47/829 |
| | | | 709/226 |
| 2016/0085467 A1* | 3/2016 | Saxena | G06F 11/2071 |
| | | | 714/766 |
| 2018/0246744 A1* | 8/2018 | Li | G06F 9/45558 |
| 2022/0147380 A1* | 5/2022 | Azaria | G06F 9/45558 |
| 2022/0180275 A1* | 6/2022 | Parizi | G06Q 10/087 |
| 2022/0224753 A1* | 7/2022 | Bartram | G06F 11/3006 |
| 2023/0125085 A1 | 4/2023 | Shemer et al. | |
| 2023/0131954 A1 | 4/2023 | Shemer et al. | |

* cited by examiner

*Primary Examiner* — Manuel L Barbee
(74) *Attorney, Agent, or Firm* — Amin, Turocy & Watson, LLP

(57) ABSTRACT

A system can determine timeseries telemetry data of resource utilization of respective data centers of a group of data centers maintained by the system. The system can predict respective hardware requests based on future resource utilization based on the timeseries telemetry data, the hardware requests comprising respective hardware requests at respective data centers of the group of data centers. The system can predict respective future times at which the respective hardware requests will occur. The system can determine respective physical location sources of hardware, respective physical location destinations of hardware, and respective amounts of hardware based on the respective hardware requests and the respective future times. The system can store an indication of the respective physical location sources of hardware, respective physical location destinations of hardware, and respective amounts of hardware.

20 Claims, 14 Drawing Sheets

800

804

| Location 806 | Resource 808 | Source 810 | Amount 812 | Delivery Time 814 | Decommission Time 816 |
|---|---|---|---|---|---|
| A | Server | S1 | 5 | 3 days | 1 day |
| A | Server | S2 | 10 | 20 days | 11 days |
| B | Server | S2 | 10 | 5 days | 2 days |
| C | Server | S4 | 45 | 7 days | 2 days |
| A | Storage | S1 | 1 | 12 days | 50 days |
| Colo-site | Server | Colo | 50 | 10 minutes | 10 minutes |

DETERMINING RESOURCE UTILIZATION DATA FOR RESPECTIVE DATA CENTERS OF A GROUP OF DATA CENTERS 1104

↓

PREDICTING RESPECTIVE HARDWARE NEEDS BASED ON FUTURE RESOURCE UTILIZATION BASED ON THE RESOURCE UTILIZATION DATA, THE HARDWARE NEEDS COMPRISING RESPECTIVE HARDWARE NEEDS AT RESPECTIVE DATA CENTERS OF THE GROUP OF DATA CENTERS 1106

↓

PREDICTING RESPECTIVE FUTURE TIMES AT WHICH THE RESPECTIVE HARDWARE NEEDS WILL OCCUR BASED ON THE RESOURCE UTILIZATION DATA 1108

↓

DETERMINING RESPECTIVE PHYSICAL LOCATION SOURCES OF HARDWARE, RESPECTIVE PHYSICAL LOCATION DESTINATIONS OF HARDWARE, AND RESPECTIVE AMOUNTS OF HARDWARE BASED ON THE RESPECTIVE HARDWARE NEEDS AND THE RESPECTIVE FUTURE TIMES 1110

GLOBAL AUTOMATED DATA CENTER EXPANSION

BACKGROUND

A data center can comprise a plurality of computers that are configured to store and/or operate on data. Managing a data center can comprise various operations.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine timeseries telemetry data of resource utilization of respective data centers of a group of data centers maintained by the system. The system can predict respective hardware requests based on future resource utilization based on the timeseries telemetry data, the hardware requests comprising respective hardware requests at respective data centers of the group of data centers. The system can predict respective future times at which the respective hardware requests will occur. The system can determine respective physical location sources of hardware, respective physical location destinations of hardware, and respective amounts of hardware based on the respective hardware requests and the respective future times. The system can store an indication of the respective physical location sources of hardware, respective physical location destinations of hardware, and respective amounts of hardware.

An example method can comprise determining, by a system comprising a processor, timeseries telemetry data of resource utilization of respective data centers of a group of data centers. The method can further comprise predicting, by the system, respective hardware requests based on future resource utilization based on the timeseries telemetry data, the hardware requests comprising respective hardware requests at respective data centers of the group of data centers. The method can further comprise predicting, by the system, respective future times at which the respective hardware requests will occur. The method can further comprise determining, by the system, respective physical location sources of hardware, respective physical location destinations of hardware, and respective amounts of hardware based on the respective hardware requests and the respective future times.

An example non-transitory computer-readable medium can comprise instructions that, in response to execution, cause a system comprising a processor to perform operations. These operations can comprise determining resource utilization data for respective data centers of a group of data centers. These operations can further comprise predicting respective hardware needs based on future resource utilization based on the resource utilization data, the hardware needs comprising respective hardware needs at respective data centers of the group of data centers. These operations can further comprise predicting respective future times at which the respective hardware needs will occur based on the resource utilization data. These operations can further comprise determining respective physical location sources of hardware, respective physical location destinations of hardware, and respective amounts of hardware based on the respective hardware needs and the respective future times.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an example resources needs table that can facilitate global automated data center expansion, in accordance with an embodiment of this disclosure;

FIG. 11 illustrates another example process flow for global automated data center expansion, in accordance with an embodiment of this disclosure;

DETAILED DESCRIPTION

Example Architectures

Figure 1:
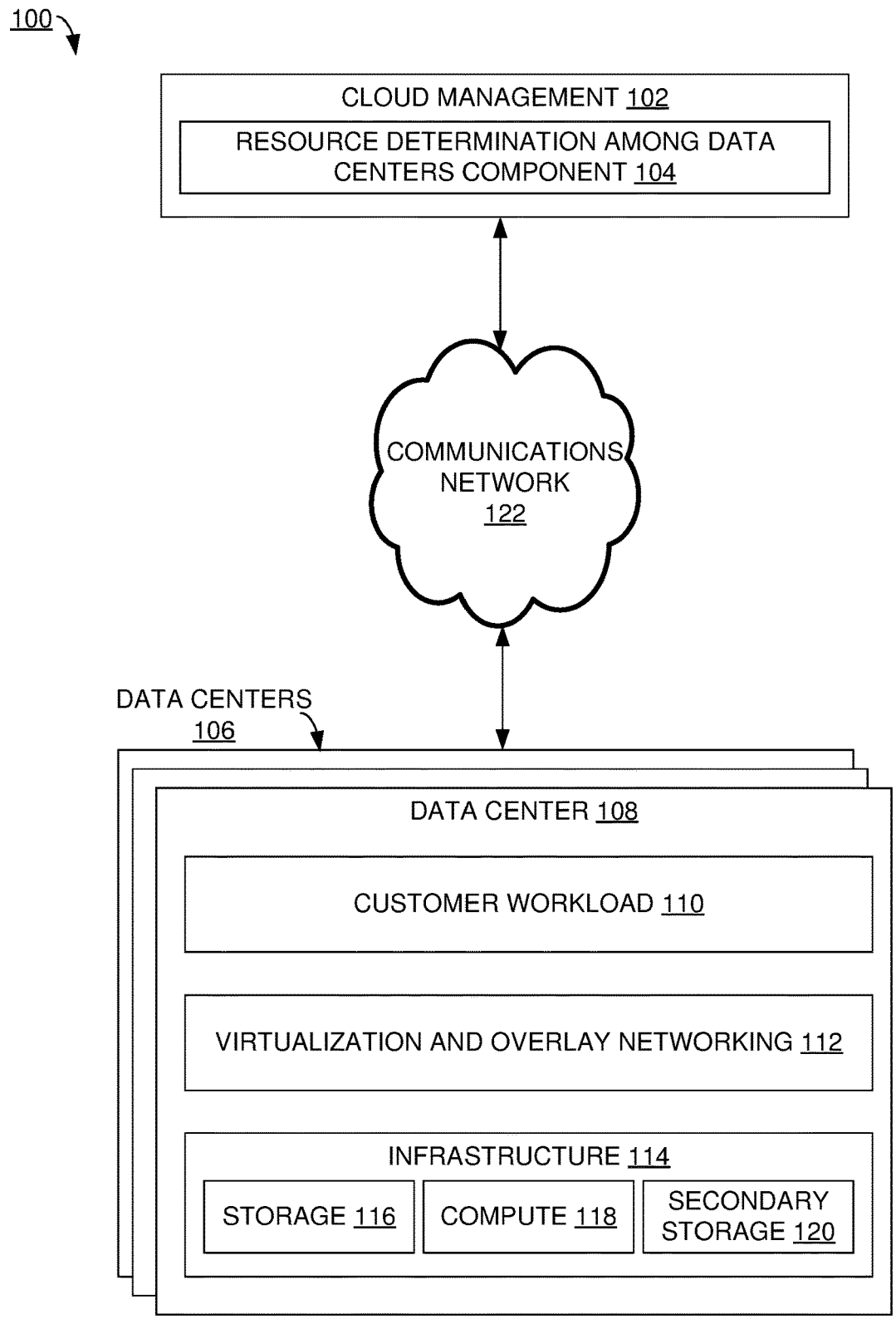
FIG. 1 illustrates an example system architecture that can facilitate global automated data center expansion, in accordance with an embodiment of this disclosure.

FIG. 1 illustrates an example system architecture 100 that can facilitate global automated data center expansion, in accordance with an embodiment of this disclosure.

System architecture 100 can facilitate deployment and management of infrastructure at customer premise or hosted locations. System architecture 100 can facilitate consuming infrastructure as a service. System architecture 100 generally targets full data center deployments (e.g., data centers 106, in an architecture that can be referred to as data centers as a service (DCaaS)). System architecture 100 can comprise data centers that run virtual infrastructure (e.g., customer workload 110 operating on top of virtualization and overlay networking 112) and can facilitate data protection and mobility use of those data centers.

A data center (e.g., data center 108) in system architecture 100 can comprise compute (e.g., compute 118), storage (e.g., storage 116), and networking, and which has a virtualization layer (e.g., virtualization and overlay networking 112). That is, system architecture 100 can deploy a data center that can run infrastructure as a service (IaaS) workloads. Where system architecture 100 deploys infrastructure as a service, this can be referred to as IaaS as a service (IaaSaaS).

System architecture 100 can differ from other cloud offerings. Some other cloud offerings support creating extensions of themselves, which can be hosted in other locations. In the example of system architecture 100, cloud management 102 can be used to orchestrate and manage a completely independent customer data center (e.g., data center 108). The manner in which technologies are used, and the way that layers (e.g., infrastructure 114 and virtualization and overlay networking 112) can be decomposed in system architecture 100 can differ from that of other cloud offerings.

That is, in other cloud offerings, such as public clouds (where workloads for multiple customers are run on the same hardware and/or in the same data center), hardware resources can generally be shared between tenants (e.g., customers). This can lead to security concerns because one customer can be sharing hardware with a rival entity (e.g., two competing consumer packaged goods companies) or a malicious actor. A security hole or data leak can cause immediate damage. In contrast, with system architecture 100, a small deployment can be created that is dedicated to a customer and data can be stored on customer premises or stored in a dedicated area for the customer.

In other cloud offerings, management can be optimized for a small number of large hardware locations. Other cloud offerings can rely on uniformity and consistency of hardware and access in order to optimize their maintenance. In contrast, system architecture 100 can be used to manage a larger number of customer locations, each with a relatively small deployment. With system architecture 100, there can be differences in hardware between customer locations according to an age and/or version of deployment, or according to a price or service level agreement designation. The management issues associated with these two types of architectures can be different.

Cloud extensions can be additional hardware from a same cloud region located in a different physical place. In system architecture 100, each location can be a separate instance, which can be connected and/or extended by utilizing the present techniques.

System architecture 100 can be utilized to connect to existing customer data center components, whereas with other cloud offerings this can constitute a security violation.

System architecture 100 can be implemented to deploy or utilize hardware of a wide range of profiles and capabilities. This hardware can include one or more servers (e.g., compute 118) with a central processing unit, memory, local storage, and peripheral devices; one or more primary storage systems (e.g., storage 116, where primary storage can generally be optimized for performance (e.g., provide a low latency for reads and writes), and be used for running an organization's main applications and workloads); network switches and devices (e.g., network and/or a storage area network (SAN); and/or additional hardware for secondary storages (e.g., secondary storage 120, where, in contrast to primary storage, secondary storage can generally be optimized for long term reliability and capacity, and used for backup and data protection systems) or other services. This hardware can also include object storage, file systems, network attached storage (NAS), hardware for performance acceleration (e.g., graphics processing units (GPUs), cache cards, central processing unit (CPU) offload cards, smart network interface cards (NICs), etc.), and/or specialized servers or other hardware for specific purposes like stream servers, messaging, artificial intelligence (AI), image processing and/or security.

In some examples, this hardware can be configured and wired by an entity that manages cloud management 102, and on behalf of a customer that possesses data center 108. The hardware can be delivered to data center 108, or can be hosted by the entity that manages cloud management 102, or by a third party. In some examples, in hosting sites, general hardware can already be available at the time of a customer order, and be allocated to a customer upon a service request.

In addition to hardware, multiple software components can be deployed and managed in accordance with customer requests.

Cloud management 102 can comprise a cloud portal that provides a purchasing and management user interface, and that facilitates ordering hardware resources; managing resource usage; monitoring and error handling; and upgrade and life cycle.

Cloud management 102 can store customer-related information and details pertaining to customer infrastructure (e.g., an architecture of data center 108).

In system architecture 100, deployed infrastructure (e.g., deployed infrastructure of data center 108) can be managed by cloud management 102, and in some examples, a customer can be billed according to the resources that the customer utilizes (which can be referred to as, pay as you go). In such examples, the customer can avoid allocating an information technology (IT) team to manage the infrastructure.

In some examples, system architecture 100 involves deploying a full data center (e.g., data center 108), where the data center is entirely managed by cloud management 102, and where the data center is targeted for a virtualized workload.

That is, system architecture 100 can involve a DCaaS where the data center is under cloud management 102 management (e.g., the customer does not provide infrastructure). Virtualized infrastructure (e.g., virtualization and overlay networking 112) can comprise a hypervisor on which the customer allocates virtual workloads (e.g., customer workload 110), which can be an IaaS implementation. That is, a full IaaS data center can be deployed as a service, and referred to as IaaSaaS.

Given those considerations, system architecture 100 can deploy an IaaS data center as a service. System architecture 100 can target a data center that is optimized for virtualized workloads on customer premises or a hosting facility. The customer can provide high-level resource definitions (e.g., intent-based provisioning) and service level agreements (SLAs) for a data center to cloud management 102. From this information, cloud management 102 can derive a data center hardware definition. Hardware corresponding to this hardware definition can be shipped to customer premise, or shipped to or allocated on a hosting site. When the hardware is shipped and ready, cloud management 102 can configure the hardware and networking, and then deploy and configure a virtualization stack on the hardware. In some examples, the hardware can be shipped, wired, deployed, and then configured. In other examples, the hardware can be pre-wired, pre-deployed, pre-configured, and then shipped. For example, one or more racks of hardware can be wired and connected, have a stack deployed on the hardware, and then the racks of hardware can be shipped. Once the racks of hardware are received at a destination, they can be connected to power and an external network and begin operations.

A data center can comprise storage (e.g., storage 116). A data center can also comprise compute (e.g., compute 118), which can comprise servers that lack (or do not utilize) local storage and are configured to boot from and store their data to storage 116. Booting can be implemented via technologies such as a preboot execution environment (PXE) book, or a network boot. The devices that the compute boots from can be configured by cloud management 102 as part of hardware and networking configuration. A data center can also comprise secondary storage (e.g., secondary storage 120). In some examples, there can be multiple instances of each of these components, and multiple different hardware models of each component can be deployed within a data center.

In some examples, local storage can be omitted from compute servers to facilitate maintenance. In such a system architecture, server hardware can be added or replaced and booted from the storage, without maintaining data on the server itself. Additionally, using a common boot device for virtual infrastructure can facilitate easier upgrades and configuration. Then, data protection can be facilitated by using such a system architecture.

Virtualization and overlay networking 112 can comprise the following to support data protection and mobility use cases. Virtualization and overlay networking 112 can comprise virtualized overlay networking (which virtualizes underlying network resources to components that operate on top of the virtual overlay network), and storage that is configured to spoof or virtualize volume identifiers (such as world wide names (WWNs)).

Where cloud management 102 manages the deployment and configuration of a data center, cloud management 102 can have information about the data center and the customer that cloud management 102 can use to manage the data center. This information can include customer infrastructure services information; ordered, deployed, and in-use resources; a customer's physical location; and customer SLAs.

System architecture 100 comprises cloud management 102, data centers 106, and communications network 122.

In turn, cloud management 102 comprises resource determination among data centers component 104. Data centers 106 comprises a plurality of data centers, including data center 108. Data center 108 comprises customer workload 110, virtualization and overlay networking 112, and infrastructure 114. Infrastructure 114 comprises storage 116, compute 118, and secondary storage 120.

Figure 14:
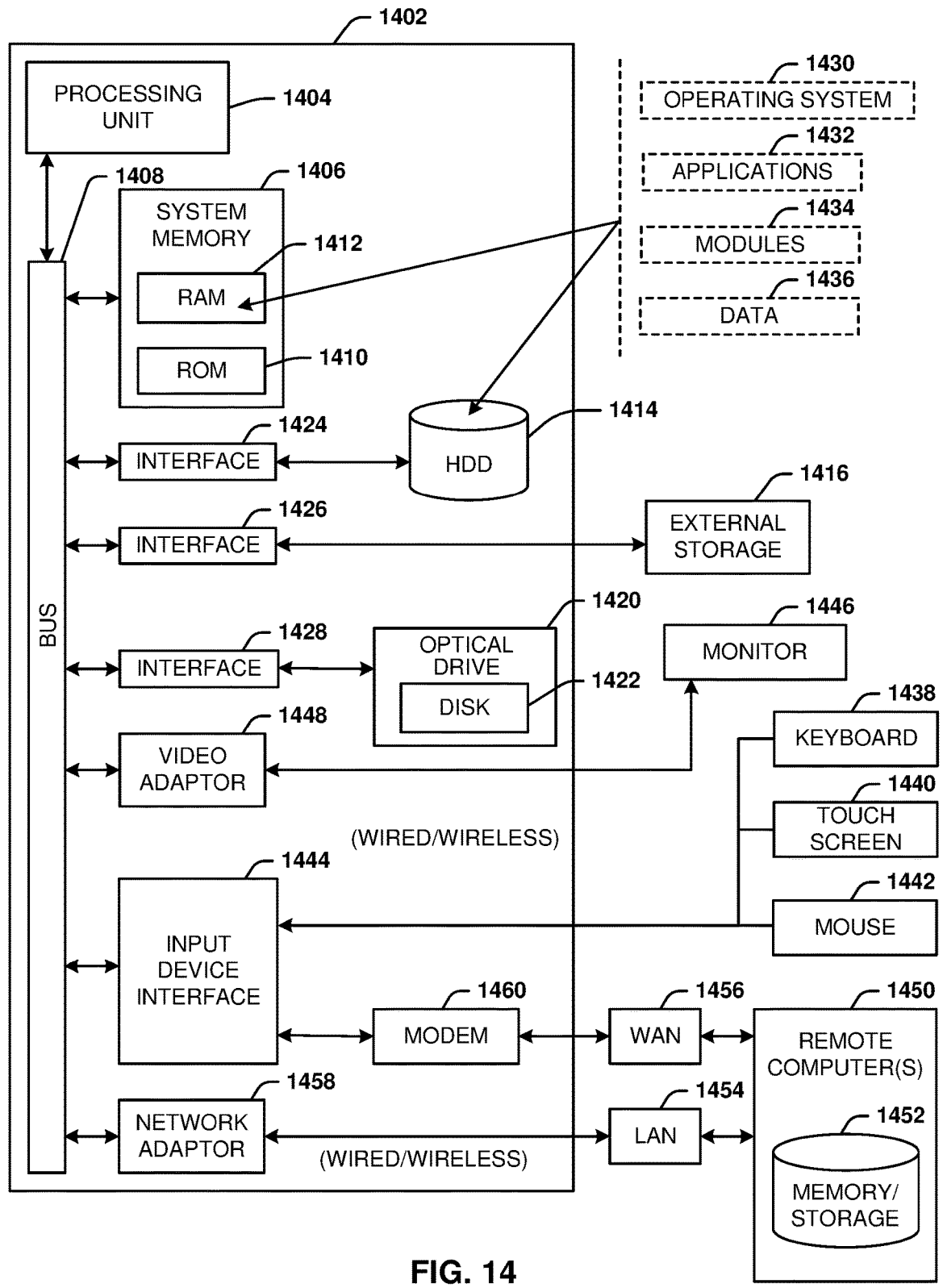
FIG. 14 illustrates an example block diagram of a computer operable to execute an embodiment of this disclosure.

Each of cloud management 102, data centers 106, and data center 108 can be implemented with part(s) of computing environment 1400 of FIG. 14. Communications network 122 can comprise a computer communications network, such as the INTERNET.

Cloud management 102 can communicate with data centers 106 and data center 108 via communications network 122 to manage data centers 106 and data center 108. In managing a data center, cloud management 102 can perform functions such as provisioning and managing virtualization and overlay networking 112, and infrastructure 114, and running customer workload 110 on data center 108.

Resource determination among data centers component 104 of cloud management 102 can manage data centers 106 and data center 108 by automatically expanding those data centers when they need additional computing resources, such as compute or storage resources. Resource determination among data centers component 104 can manage this expansion for multiple datacenters that it controls, in concert (e.g., resource determination among data centers component 104 can evaluate the expansion needs of multiple separate customers' data centers in determining how to handle expansion for all of the data centers). In effectuating global automated data center expansion, resource determination among data centers component 104 can implement part(s) of the operating procedures of FIGS. 9-13.

Customer workload 110 can comprise workloads provided by a customer of data center 108 that operate on data center 108. Customer workload 110 can comprise a virtualized workload—e.g., a virtual machine on which customer components operate, and where the virtual machine operates on top of virtualization and overlay networking 112.

Virtualization and overlay networking 112 can comprise virtualization management component (e.g., a hypervisor) that supports the execution of customer workload 110. Virtualization and overlay networking 112 can also comprise storage virtualization. In some examples, the virtualization management can comprise management for virtual machine-based virtualization, for container-based virtualization, for other types of virtualization, or for a combination of types of virtualization.

Infrastructure 114 can comprise computer hardware of data center 108. Storage 116 can comprise storage devices upon which computer data can be stored. Compute 118 can comprise one or more servers that process data stored on storage 116. In some examples, compute 118 omits using its own local storage, and instead uses storage 116 for storage. This separation of compute and storage hardware can facilitate managing a data center, as well as restoring a data center. Secondary storage 120 can be similar hardware to storage 116. Where storage 116 is used by compute 118, secondary storage can be used for backup and staging of data, such as to store a snapshot of storage 116, or to store data send from cloud management 102 in the course of managing data center 108.

Figure 2:
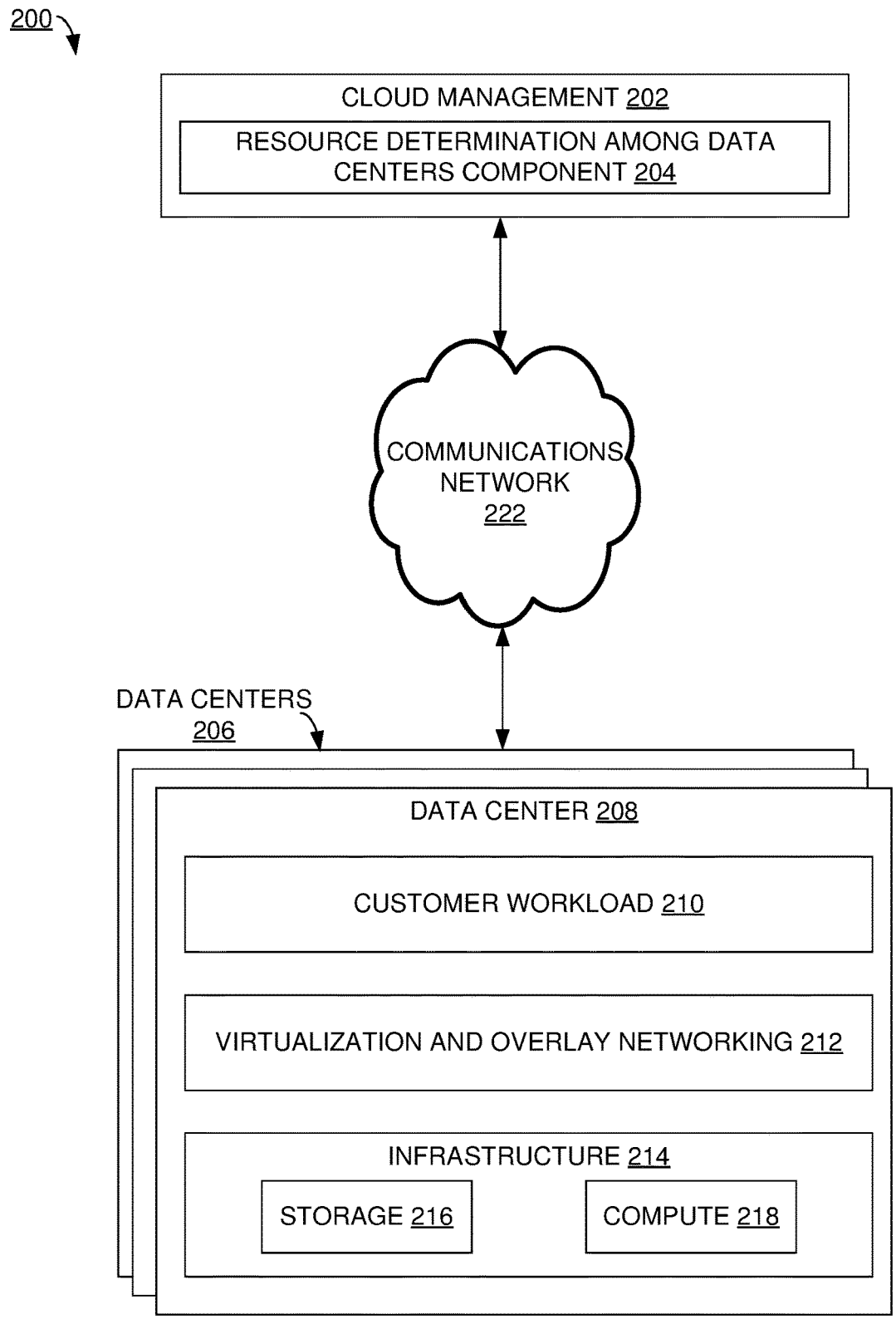
FIG. 2 illustrates another example system architecture that can facilitate global automated data center expansion, in accordance with an embodiment of this disclosure.

FIG. 2 illustrates another example system architecture 200 that can facilitate global automated data center expansion, in accordance with an embodiment of this disclosure.

System architecture 200 comprises cloud management 202, data centers 206, and communications network 222 (which can be similar to cloud management 102, data centers 106, and communications network 122 of FIG. 1, respectively).

In turn, cloud management 202 comprises resource determination among data centers component 204 (which can be similar to resource determination among data centers component 104). Data centers 206 comprises a plurality of data centers, including data center 208 (which can be similar to data center 108). Data center 208 comprises customer workload 210, virtualization and overlay networking 212, and infrastructure 214 (which can be similar to customer workload 110, virtualization and overlay networking 112, and infrastructure 114, respectively). Infrastructure 214 comprises storage 216 and compute 218 (which can be similar to storage 116 and compute 118, respectively).

A difference between system architecture 200 and system architecture 100 can be that system architecture 200 lacks secondary storage in data center 208 while system architecture 100 has secondary storage 120 in data center 108. Despite this difference, system architecture 200 and system architecture 100 can still each be implemented to facilitate data center restoration.

Figure 3:
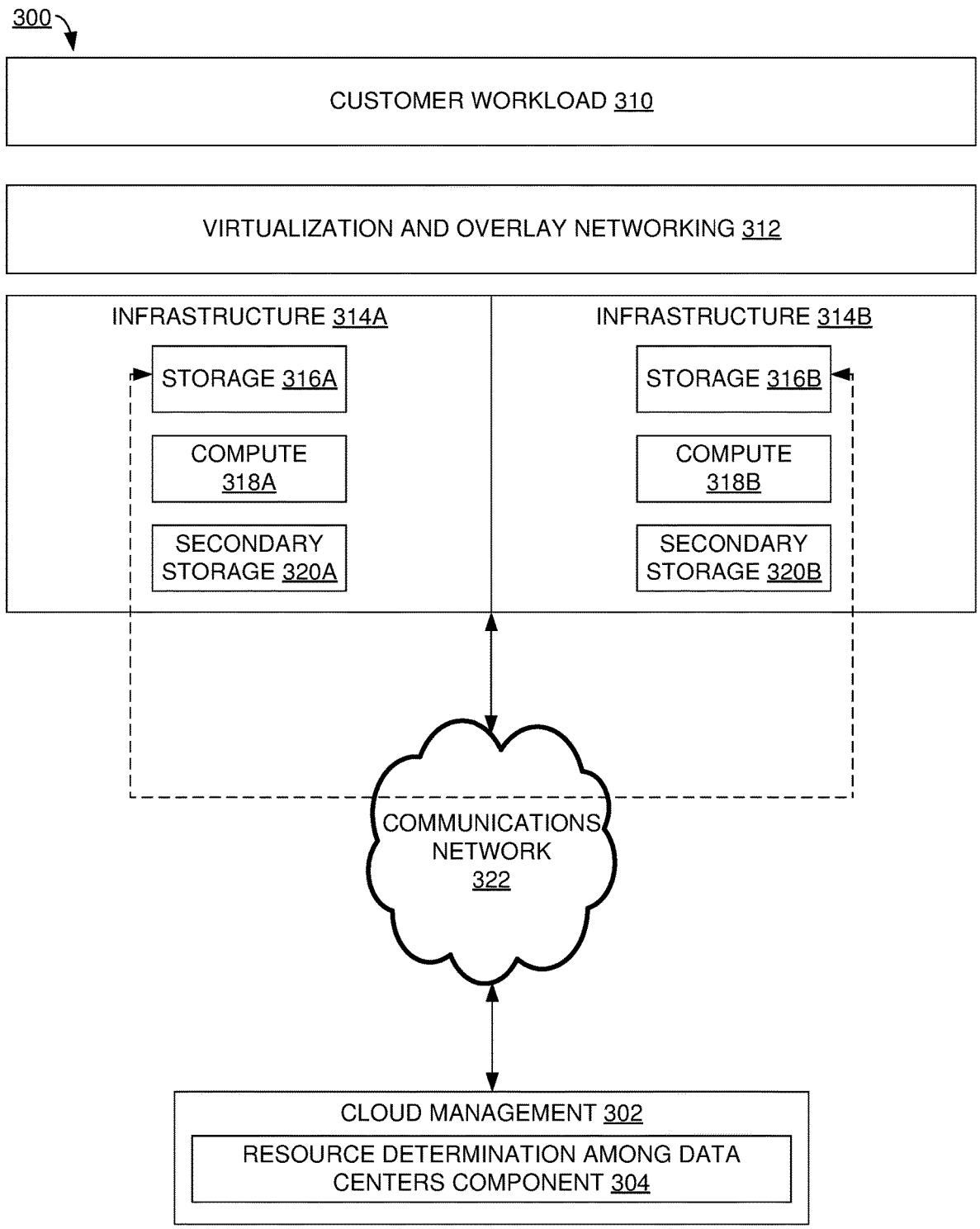
FIG. 3 illustrates another example system architecture that can facilitate global automated data center expansion, in accordance with an embodiment of this disclosure.

FIG. 3 illustrates another example system architecture 300 that can facilitate global automated data center expansion, in accordance with an embodiment of this disclosure.

System architecture 300 comprises cloud management 302, customer workload 310, virtualization and overlay networking 312, infrastructure 314A, infrastructure 314B, and communications network 322 (which can be similar to cloud management 102, customer workload 110, virtualization and overlay networking 112, infrastructure 114, another instance of infrastructure 114, and communications network 122 of FIG. 1, respectively).

In turn, cloud management 302 comprises resource determination among data centers component 304 (which can be similar to resource determination among data centers component 104). Customer workload 310 and virtualization and overlay networking 312 can be similar to customer workload 110 and virtualization and overlay networking 112, respectively.

Infrastructure 314A comprises storage 316A, compute 318A, and secondary storage 320A (which can be similar to storage 116, compute 118, and secondary storage 120, respectively). Infrastructure 314B comprises storage 316B, compute 318B, and secondary storage 320B (which can be similar to storage 116, compute 118, and secondary storage 120, respectively).

Using storage mirroring (e.g., mirroring of storage 316A and storage 316B), networking technology (such as virtualization and overlay networking 312), and with active compute (e.g., compute 318A and compute 318B), on both locations of a distributed data center (e.g., infrastructure 314A and infrastructure 314B), a distributed data center can automatically be created. Each component data center of a distributed data center can have active compute and workloads, and workloads can be run freely on both locations.

Storage 316A and storage 316B can be configured in a mirroring configuration, where writes written to one storage are immediately and inline mirrored to the other. This configuration can mean that data in storage 316A and storage 316B can be identical (or mirrored). In some examples, technologies such as redundant array of inexpensive disks (RAID) 1, synchronous storage replicas, distributed storage volumes, synchronous clones, and active-active storage volumes can be used to implement mirroring between storage 316A and storage 316B.

While the example of system architecture 300 (and system architecture 400 of FIG. 4) illustrates two data centers in a distributed data center, it can be appreciated that there can be distributed data centers made up of more than two data centers. In some examples, component data centers in a distributed data center (e.g., infrastructure 314A and infrastructure 314B) can be referred to as "data center locations," to distinguish these component data centers from the collected distributed data center.

A distributed data center as in system architecture 300 can be used for data center expansion beyond the physical limits of a data center facility. One data center location can run out of floor space, reach electricity load limits, or air conditioning limits, and so additional expansion is to happen at a different location.

In some examples, the data center locations in a distributed data center are not identical in terms of hardware capabilities, but are managed and exposed to users as one unified data center.

In some examples, cloud management 302 can communicate with virtualization management of virtualization and overlay networking 312 to create affinity between workloads, to designate coupled workloads to run at a same data center location. This approach of affinity between workloads can increase runtime efficiency.

In some examples, a distributed data center architecture can be distinguished from an availability zone architecture. In some examples, an availability zone architecture is active/passive between zones, whereas multiple data center locations of a distributed data center are active concurrently.

In some examples, an availability zone architecture involves nearly-identical data centers (where a passive data center is to handle all workloads being processed by an active data center), whereas data center locations in a distributed data center can be more heterogenous. An availability zone architecture can require identical storage in both locations, whereas it can be that a distributed architecture does not require this. An availability zone architecture can implement a high availability mechanism to orchestrate a failover between data centers for a workload to migrate, and this can be omitted in a distributed data center architecture. In some examples, an availability zone architecture involves separate power and infrastructure to make the availability zones separately available where one fails, and there can be examples of distributed data center architectures where this is neither required nor needed.

Figure 4:
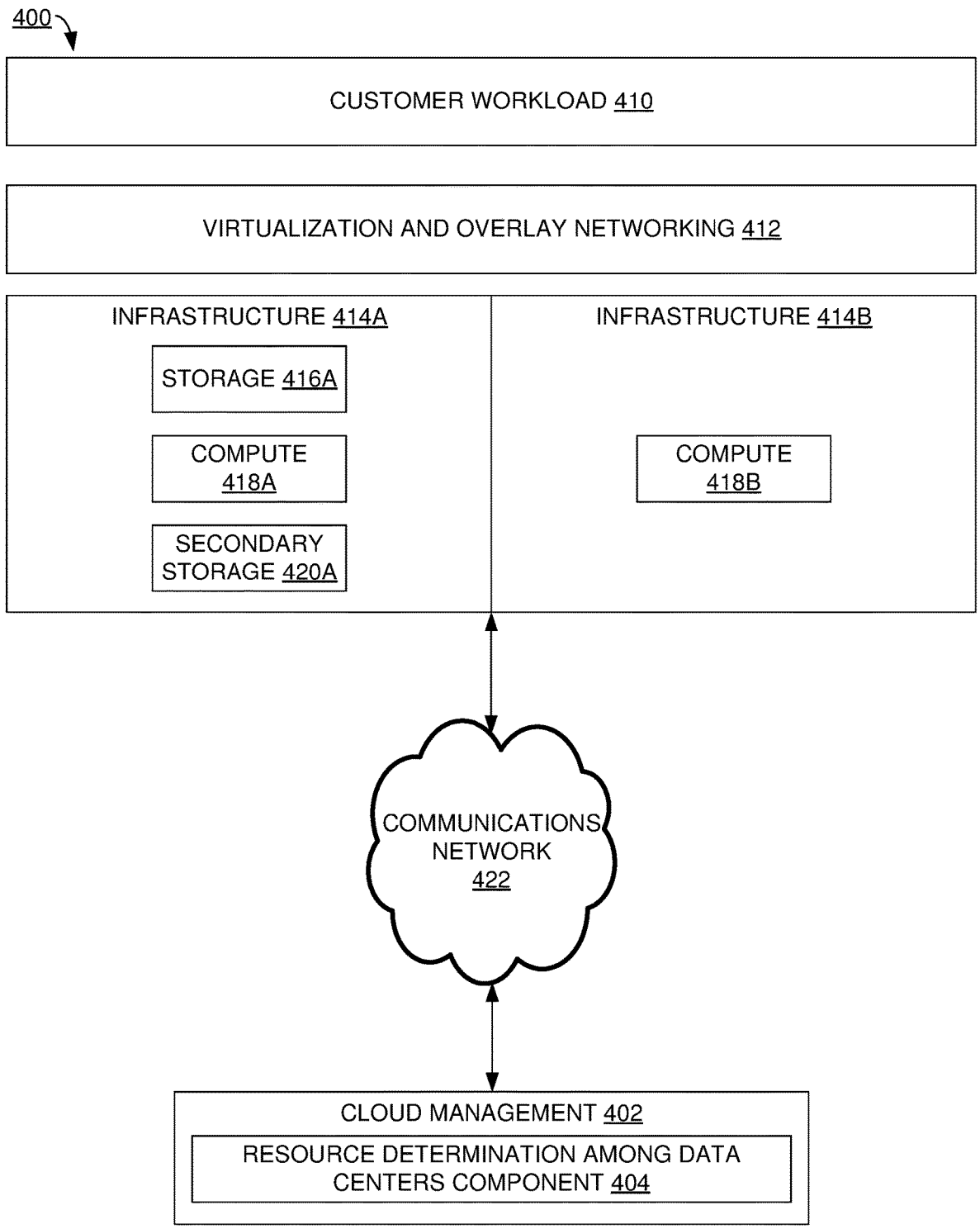
FIG. 4 illustrates another example system architecture that can facilitate global automated data center expansion, in accordance with an embodiment of this disclosure.

FIG. 4 illustrates another example system architecture 400 that can facilitate global automated data center expansion, in accordance with an embodiment of this disclosure.

System architecture 400 comprises cloud management 402, customer workload 410, virtualization and overlay networking 412, infrastructure 414A, infrastructure 414B, and communications network 422 (which can be similar to cloud management 102, customer workload 110, virtualization and overlay networking 112, infrastructure 114, another instance of infrastructure 114, and communications network 122 of FIG. 1, respectively).

In turn, cloud management 402 comprises resource determination among data centers component 404 (which can be similar to resource determination among data centers component 104). Customer workload 410 and virtualization and overlay networking 412 can be similar to customer workload 110 and virtualization and overlay networking 112, respectively.

Infrastructure 414A comprises storage 416A, compute 418A, and secondary storage 420A (which can be similar to storage 116, compute 118, and secondary storage 120, respectively). Infrastructure 414B comprises compute 418B (which can be similar to compute 118). A difference between system architecture 400 and system architecture 300 of FIG. 3 is that system architecture 400 depicts a distributed storage system where some infrastructure (infrastructure 414B) omits storage. In some examples, a distributed data center can comprise at least two physical data center locations that have other hardware differences, such as differences in compute, secondary storage, object storage, file systems, NASes, hardware for performance acceleration, and specialized servers or hardware for specific purposes.

In such examples, storage 416A can be used for storage for the distributed data center, and both compute 418A of infrastructure 414A and compute 418B of infrastructure 414B can operate on data that is stored in storage 416A.

Figure 5:
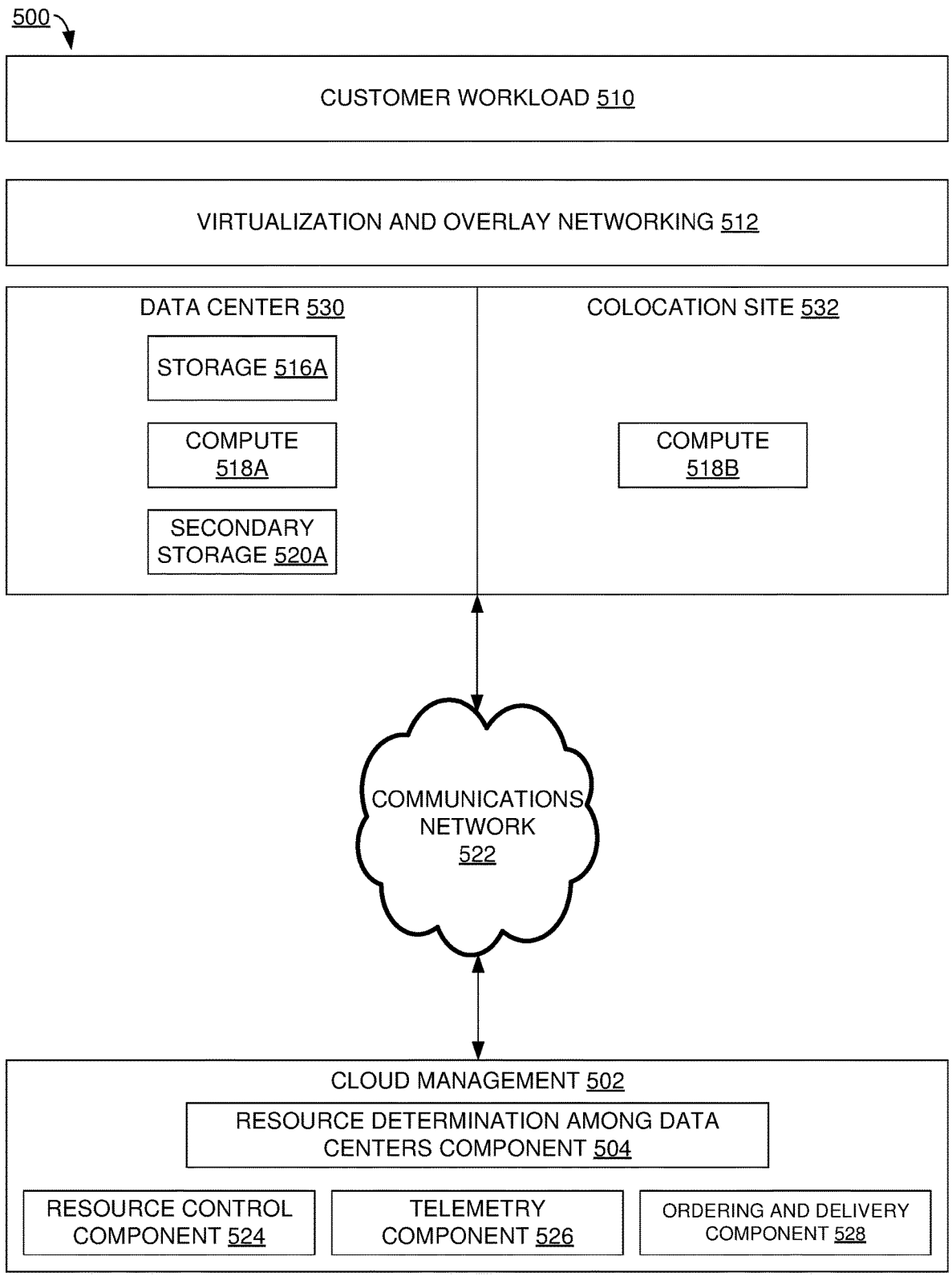
FIG. 5 illustrates another example system architecture that can facilitate global automated data center expansion, in accordance with an embodiment of this disclosure.

FIG. 5 illustrates another example system architecture 500 that can facilitate global automated data center expansion, in accordance with an embodiment of this disclosure.

System architecture 500 comprises cloud management 502, customer workload 510, virtualization and overlay networking 512, data center 530, colocation site 532, and communications network 522 (which can be similar to cloud management 102, customer workload 110, virtualization and overlay networking 112, infrastructure 114, another instance of infrastructure 114, and communications network 122 of FIG. 1, respectively).

In turn, cloud management 502 comprises resource determination among data centers component 504 (which can be similar to resource determination among data centers component 104). Customer workload 510 and virtualization and overlay networking 512 can be similar to customer workload 110 and virtualization and overlay networking 112, respectively.

Data center 530 comprises storage 516A, compute 518A, and secondary storage 520A (which can be similar to storage 116, compute 118, and secondary storage 120, respectively). Colocation site 532 comprises compute 518B (which can be similar to compute 118).

As compared with system architecture 400 of FIG. 4, in system architecture 500, cloud management 502 comprises additional components. Cloud management 502 comprises resource control component 524, telemetry component 526, and ordering and delivery component 528.

Resource control component 524 can automatically determine an amount of resources needed by a data center, when they are needed, and where they will be deployed (e.g., at the data center location that is being expanded, at another data center location, or at a collocated location).

Resource control component 524 can accumulate and analyze telemetry information from telemetry component 526, and derive resources from that telemetry information. Telemetry component 526 can collect timeseries telemetry data from a data center.

Timeseries telemetry data can be utilized to understand resource usage and trends. Telemetry data can include an amount of resources, resource usage levels for various resources (e.g., load, throughput, input/output operations per second (IOPS), and latency). From this data, average and peak resource utilization levels can be determined, and workload levels can be determined. Trend analysis can be performed on this average resource utilization level, peak resource utilization level, and workload level data.

Trend derivation can be performed to determine whether data is stationary. Stationary data can generally comprise data that has some local variance, but no significant long-term change. Non-stationary data can generally comprise data that shows growth, decline, or some other modification. A decomposition model can divide data into categories, such as trend (a long-term progression of a series, which can be linear or nonlinear), cyclic (repeated, periodic or nonperiodic variations in data), seasonal (changes attached to dates, seasons, and time (e.g., night or day), where a time and duration can be known), event (events such elections, sporting events, or significant weather events like a hurricane), and random (residual random or irregular noise).

Trend, seasonal, and event data can be determined. Other noise can be removed by using low-pass filters, weights, or other smoothing techniques.

Trend, seasonal, and event data can be determined by approaches such as auto regression integrated moving average (ARIMA) techniques, seasonal ARIMA (SARIMA) techniques, variations of ARIMA techniques, auto-correlation techniques, analysis of variance (ANOVA) techniques, and functional decomposition techniques.

With this data from telemetry component 526, resource control component 524 can have insights into long-term trends, as well as seasonal and temporary occurrences for which resource usage can be predicted.

Telemetry data can provide workload levels and resource utilization levels at fine grained intervals. In some examples, resources for a data center can be designed to contain a level that can handle most peak levels with some to spare. That is, data centers can have some slack (e.g., extra) resources so that small fluctuations and standard peaks are not an issue to process. Slack resources can also provide more time to detect and deliver additional resources to a data center.

Given average workload levels and average resource usage, resource control component 524 can determine or extrapolate a maximal workload level that one element of hardware can handle. An example determination is $$\frac{\text{Workload level on a unit}}{\text{Resource usage percent}} = \frac{X}{100\%},$$

where X is a workload level that will max out the hardware unit. With some spare margin included, this determination can be used to make a direct correlation between expected workload levels and hardware resource amount.

Thus, resource control component 524 can determine an expected amount of resources needed. Trend data (determined from data gathered by telemetry component 526) can provide growth as well as a determination of when resources will be needed, so how much time there is to respond. Where the resource increase is at a level that requires an immediate resource response, then a colocation site can be used to address the additional resources, as there can be hardware that is ready to be put into service for expanding the data center (where the hardware is at a colocation site, that hardware can be used to expand any of several distributed data centers). A response time can affect a determination of whether to deploy additional resources to a colocation site, or on premises. Additionally, or at a later time, hardware can be installed on premises. In some examples, a data center expansion can initially be made at a colocation site, and then switched to on premises after new hardware has been installed on premises.

A colocation site (sometimes referred to as a hosted site) can generally comprise a physical data center location that is separate from a customer's physical data location, that is managed and/or owned by an entity other than the customer, and that is configured to operate workloads for multiple customers. A colocation site can differ from an on-premises data center in that an on-premises data center can be owned and/or controlled by one customer and used to operate that one customer's workloads.

In some examples, a colocation site can have preinstalled hardware that is not associated with a particular customer that is ready for use. As such, the delivery time for such hardware in a colocation site can be immediate or near immediate. Therefore, in some examples, colocations can be better equipped to handle immediate needs. In parallel with serving immediate needs via a colocation site, hardware can be shipped and deployed to an additional location where it takes longer to run workloads on it, the workloads eventually moved to the additional location, and the hardware at the collocation freed and reset for general use again.

Resource control component 524 can connect to ordering and delivery component 528 to place an order and location of hardware. Alerts, anomaly detection, and logging can help determine if something extreme is occurring that is causing the expansion of a data center.

In some examples, the present techniques can be applied to releasing hardware in addition to allocation.

After hardware to expand a data center is deployed, virtual load balancing can be applied to a data center to redistribute a load of the data center based on a current resource state of the data center.

Using these techniques, hardware usage in a data center can be automatically expanded or shrunk. The present techniques can be applied to gather telemetry and performance information, and use that information to derive a resource need prediction. The present techniques can also be applied to determine how much hardware to deliver to a data center, and whether to deploy that hardware on premises or in a colocation site, based on delivery time to on premises.

Example Process Flows

Figure 6:
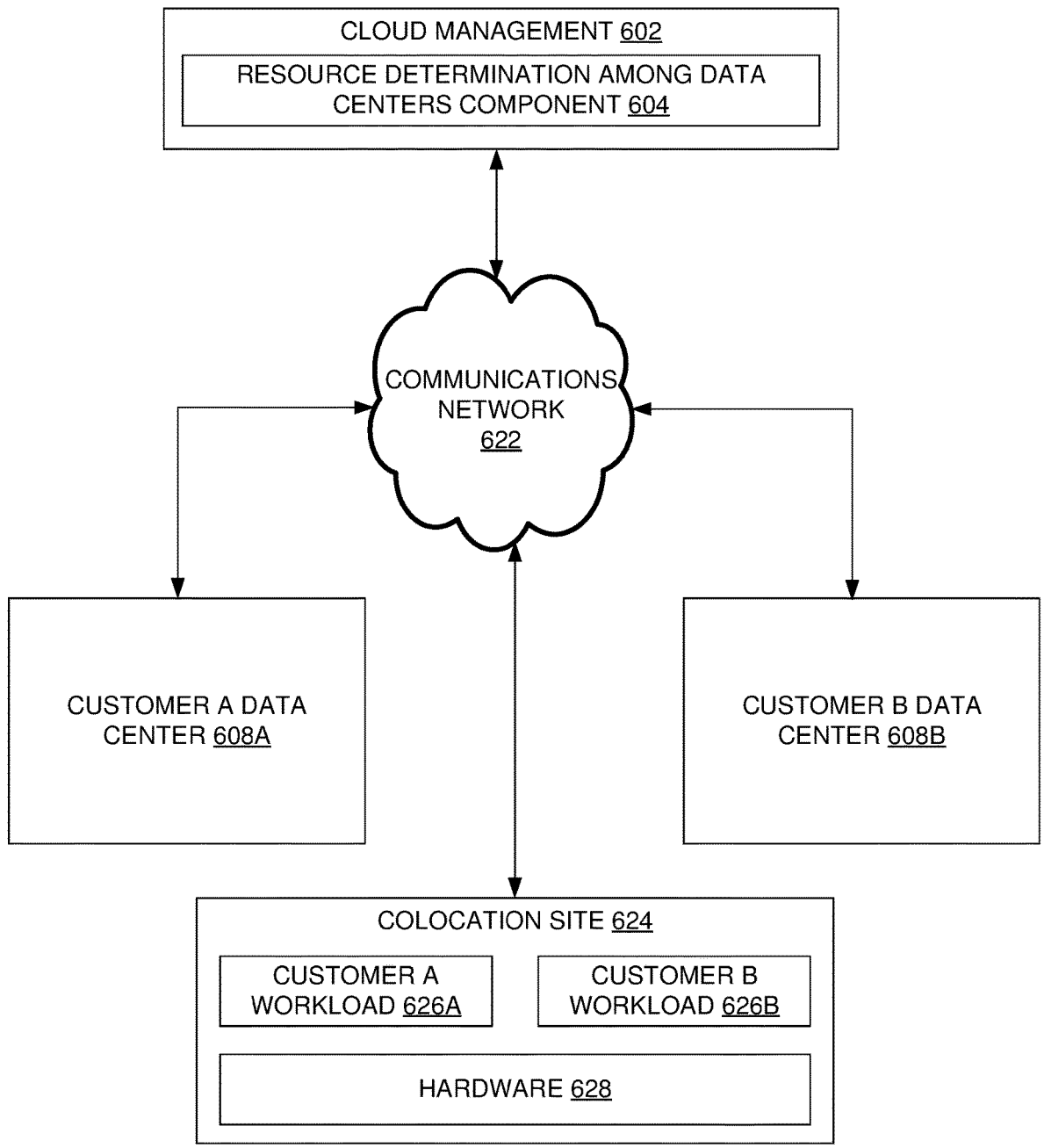
FIG. 6 illustrates another example system architecture that can facilitate global automated data center expansion, in accordance with an embodiment of this disclosure.

FIG. 6 illustrates another example system architecture 600 that can facilitate global automated data center expansion, in accordance with an embodiment of this disclosure.

As depicted, system architecture 600 comprises cloud management 602 and resource determination among data centers component 604 (which can be similar to cloud management 102 and resource determination among data centers component 104 of FIG. 1) respectively.

System architecture 600 also comprises customer A data center 608A and customer B data center 608B (which can each be similar to data center 530 of FIG. 5), and colocation site 624 (which can be similar to colocation site 532).

Colocation site 624 comprises hardware 628 (which can be similar to the hardware of data center 108 of FIG. 1—e.g., storage 116 and compute 118), customer A workload 626A and customer B workload 626B.

Communications network 622 can be similar to communications network 122 of FIG. 1.

Customer A data center 608A can be a data center located on premises for one customer (customer A), and customer B data center 608B can be a data center located on premises for another customer. Each of customer A data center 608A and customer B data center 608B can be part of a distributed data center in conjunction with colocation site 624 (e.g., a distributed data center similar to as depicted in system architecture 500 of FIG. 5). Customer A workload 626A operates on colocation site 624 as part of colocation site serving as part of a distributed data center in conjunction with customer A data center 608A. Similarly, Customer B workload 626B operates on colocation site 624 as part of colocation site serving as part of a distributed data center in conjunction with customer A data center 608B.

In some examples, customer A data center 608A is used exclusively for operating customer A's workloads; customer B data center 608B is used exclusively for operating customer B's workloads; and colocation site 624 is configured to operate workloads belonging both to customer A (customer A workload 626A) and customer B (customer B workload 626B).

When resource determination among data centers component 604 determines to expand one or more data centers, resource determination among data centers component 604 can determine whether to locate that new hardware in data customer A data center 608A, customer B data center 608B, and/or colocation site 624.

It can be appreciated that there can be examples that contain more data center locations than are depicted in system architecture 600, and where resource determination among data centers component 604 can manage more than two customers' data centers. For example, a customer's data center can comprise multiple instances of customer A data center 608A that are geographically distributed, and/or multiple instances of colocation site 624 that are geographically distributed.

Example Resource Needs

Figure 7:
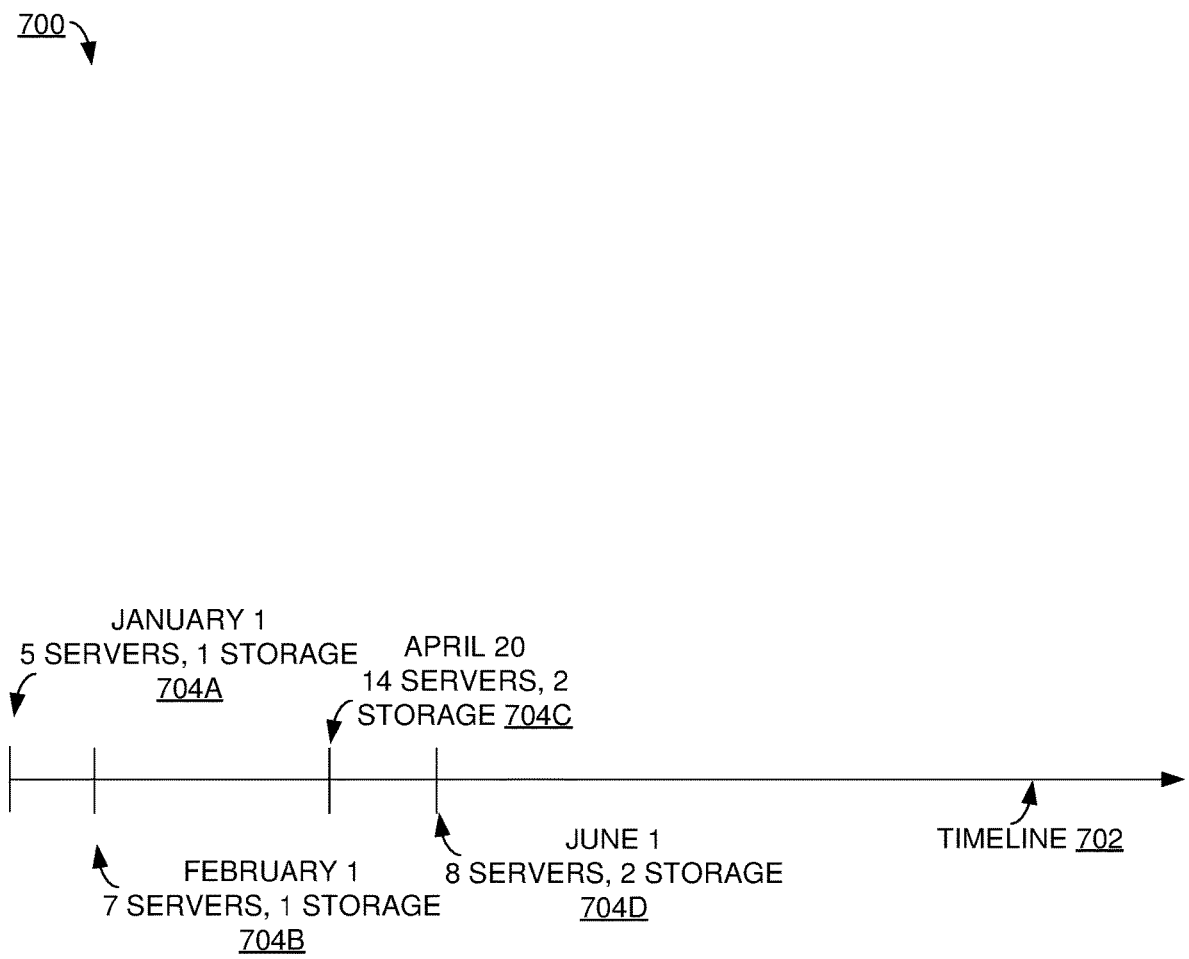
FIG. 7 illustrates an example resource needs timeline that can facilitate global automated data center expansion, in accordance with an embodiment of this disclosure.

FIG. 7 illustrates an example resource needs timeline 700 that can facilitate global automated data center expansion, in accordance with an embodiment of this disclosure. In some examples, resource needs timeline 700 can be implemented by resource determination among data centers component 604 of FIG. 6 as part of facilitating global automated data center expansion.

As depicted, resource needs timeline 700 comprises timeline 702, and four instances of resource needs on timeline 702—January 1 (5 servers, 1 storage) 704A, February 1 (7 servers, 1 storage) 704B, April 20 (14 servers, 2 storage) 704C, and June 1 (8 servers, 2 storage) 704D.

Based on a forecast of usage trends, including seasonal occurrence, expected peak usage and when these peaks will occur can be determined. These peaks can be correlated to resource usage, and an amount of resources of each type (e.g., processing, memory, storage, and network) can be determined given existing customer levels and consumption. From this, a time plot of what resources are needed and at what time can be generated. This time plot can provide both upward and downward resource level information.

Resource needs timeline 700 can indicate a prediction within a certain accuracy range. Additionally, unforeseen events can change the prediction. Furthermore, an introduction of new applications or software changes can alter system parameters.

Given these considerations, an evaluation to generate a timeline as resource needs timeline 700 can be performed continuously or periodically in order to identify and adjust to these changes.

FIG. 8 illustrates an example resource needs table 800 that can facilitate global automated data center expansion, in accordance with an embodiment of this disclosure. In some examples, resource needs table 800 can be implemented by resource determination among data centers component 604 of FIG. 6 as part of facilitating global automated data center expansion.

Resource needs table 800 comprises rows 802 and columns 804. In turn, columns 804 comprises location 806, resource 808, source 810, amount 812, delivery time 814, and decommission time 816.

It can be that hardware allocation takes time to happen, and is associated with costs and physical restrictions (e.g., inventory levels, floor space, access to facilities, travel time, etc.). As a result, in some examples, rather than responses being of the form "allocate 15 servers," they can be of the form "deliver 5 servers to location A, and 3 servers to location B, and 7 to location C" (as well as defining from where the servers will be shipped).

Resource needs table 800 can comprise a table that, for each data center location, identifies an amount of resources and delivery time to that location.

Resource needs table 800 indicates that location A can get servers from two locations (S1 and S2), but with large differences in delivery time (3 days and 20 days, respectively). A colocation site has servers ready to go (e.g., they are installed and can be booted up), but in some examples using those servers is suboptimal, because if the new resources are not needed for 8 days (for example), then there can be no need to use a ready-made resource (as other customers can have more immediate needs). Decommission time can indicate an amount of time involved with removing a resource (e.g., offloading a workload or data, cleaning up the server, and shipping the server to another location).

Where a cloud management component (e.g., cloud management 602 of FIG. 6) has a global view of needs of all customers being managed by the cloud management component, an optimization technique (e.g., greedy, evolutionary, or neural network) to determine a match for delivery over all customers. A set of constraints can be derived to determine that resources distributed do solve a problem of resource allocation for data center expansion across multiple customers' data centers.

Constraints can involve delivery of hardware from a source location to a destination location. A delivery constraint can be, that if X resources are needed by time Y, and a delivery time to a location is longer than Y, then that location will not be used. Another delivery constraint can be that, if there are fewer than X resources at a source, more than one location can be utilized in sourcing the resource.

Other constraints can center around physical characteristics of a location—e.g., available floor space, available rack space, available electricity, available air conditioning, etc.—which can limit a location's ability to host hardware.

Constraints can also involve cost. A constraint related to cost can involve minimizing source locations. There can be examples where it is determined to be better to deliver all items from one location. For example, where location A requires nine servers in 21 days, it can be determined wither to get five servers in three days from one source and another four servers in 20 days from another source, or whether to get all servers delivered from the second source in 20 days. It can be that sending only one delivery truck and coordinating one installation can reduce cost. A decision can depend on organizational costs for people, trucks, technicians, etc.

Another constraint involving cost can relate to avoiding waste. There can be an example where 14 servers are needed on June $20^{th}$, five servers are needed on June $1^{st}$, and 10 servers are needed on June $6^{th}$. It can be determined that it is not worth decommissioning down to 7 servers by June $1^{st}$ just to add more servers by June $6^{th}$. In some examples where delivery time is immediate (like with a colocation site), it can be determined to do this decommissioning. And it can be determined not to do this decommissioning in other examples that involve physically decommissioning servers. Analyzing future resource usage estimates in a timeline can be done to make this determination.

In some examples where hardware is not currently needed, if that hardware does not have an immediate need elsewhere, the decommissioning of the hardware can be delayed and performed at a later time, giving a chance for the hardware to eventually be used in its current location, or possibly saving on transport by moving directly from one customer location to another, rather than to an intermediary warehouse.

Constraints can also involve latency and SLA. It can be that a customer has an application running in location A, and it can be predicted that five more servers are needed in a few days for that application. Additionally, it can be that location A has physical room for only three more servers. In one example, three servers can be delivered to location A and another two servers can be delivered to another location. In another example, all five servers can be delivered to the other location. Latencies, or SLAs, can play a part in this decision. Since the application is running in location A in this example, it can require the servers to be in the same physical location to meet latency requirements. But there is not enough room in location A.

However, a cloud management platform (e.g., cloud management 602 of FIG. 6) can control virtual infrastructure. In some examples, a cloud management platform can move the application to another location, which frees enough resources (With or without additional resources being delivered). A cloud management platform can provide location clues and affinity constraints to aid in placing workloads where they are better served to a virtualization management component that performs load balancing on virtualized workloads.

A cloud management platform (e.g., cloud management 602 of FIG. 6) can optimize, or otherwise improve or determine, resource allocation. A cloud management platform can have a global view of needs of customers for whom the cloud platform manages data centers, and this can be expressed in the example of resource needs table 800 of FIG. 8. A cloud management platform can use this information to make resource delivery decisions across all customers (and their data centers) that it manages.

Optimization techniques can involve optimizing for some score value (e.g., cost), given a set of data and constraints. Optimization techniques can seek a solution to the problem under the given constraints that maximizes or minimizes the score value.

In some examples, an exhaustive search of the parameter space can take too long, so there can be a tradeoff of speed v. accuracy. Examples of optimization techniques can be greedy techniques (where easy local gains are found), evolutionary techniques (where large populations converge over time), and neural networks.

Using optimization techniques, a cloud management platform can determine to optimize for a metric, such as cost or SLA. The cloud management platform can find a best solution (or close to a best solution) that meets a set of constraints. This can result in a system that expands and shrinks data centers according to customer needs and in an optimal way.

An example implementation of an evolutionary technique for optimization can be as follows. The problem can be defined as a match of how many resources to supply from a source $S_i$ to location $X_i$ (or remove from $X_i$ and deliver to $S_i$). This can be expressed as a vector of tuples ($S_i$, $X_i$, amount).

A valid solution can be an instance of the vector that meets the constraints. A cloud management platform can identify the best valid vector.

A score function (where a minimum value is found) can be, for each customer data center, finding an expected resource value level E (which can be determined from trend analysis), and assigned resources from vector A. The goal can be to make E−A to be zero (e.g., to send as many resources as are needed, but no more). A score value can be a sum over all datacenters of the absolute value of E−A*100, where 100 is a penalty value. Additionally, a hard constraint violation (like assigning servers to a physical location that lacks sufficient rack space for them) can be assigned a penalty value of 10,000. Then, a cost component can be added for each delivery.

A target can be to minimize this score function to reduce cost and violations.

This score function can be expressed in the following pseudocode:
   Initialization:
     Create a population of 100000 random vectors
     Calculate score on each vector Generation=1
Until top score is "good enough" or generation>1000 {
   Keep top 10% and bottom 1% of vectors (the survivors)
   Expand the population back to 100000 by combining sections of pairs of the survivor vectors (a.k.a. crossover) or by randomly changing values at some low probability (mutation).
   Calculate score on each vector
}

The score function can select a random population, and for 1,000 generations, pick the best to survive (and, in some cases, a little of the worst to increase diversity). Then, these survivors can be combined (sometimes referred to as "mated"), and the process can be repeated. This can be referred to as an evolutionary technique (or a biological technique, as it can resemble chromosome operations). The technique can generally converge in a few generations.

For example, using the example of the above pseudocode, the top 10% and bottom 1% can be kept. In some examples, a top percentage is used (and a bottom percentage is not), and rely on mutation. In such an example, a low probability could be 0.4%. in some examples, a way that survivors can expand is to include them, and add variances (from mating, crossovers, or mutations). That can mean that every generation is either the same as before (where previous survivors still have the best scores), or some newcomers have a better score, and the overall generation is improved. This approach can ensure that there is not regression to a generation being worse than the preceding generation.

A result can be that a top vector score (the minimum value) is the one to select, as it minimizes cost and provides a best resource allocation. This can provide for a globally optimized solution across multiple customers' data centers.

The present techniques can be implemented to manage resources of multiple customers' data centers in a globally optimized way by using constraints and optimization techniques. In doing so, telemetry and performance information can be gathered and used to derive a resource need prediction. Additionally, an optimization technique can be applied in order to find a globally optimal (or generally good) resource placement, given a set of delivery, cost, and SLA constraints.

Example Process Flows

Figure 9:
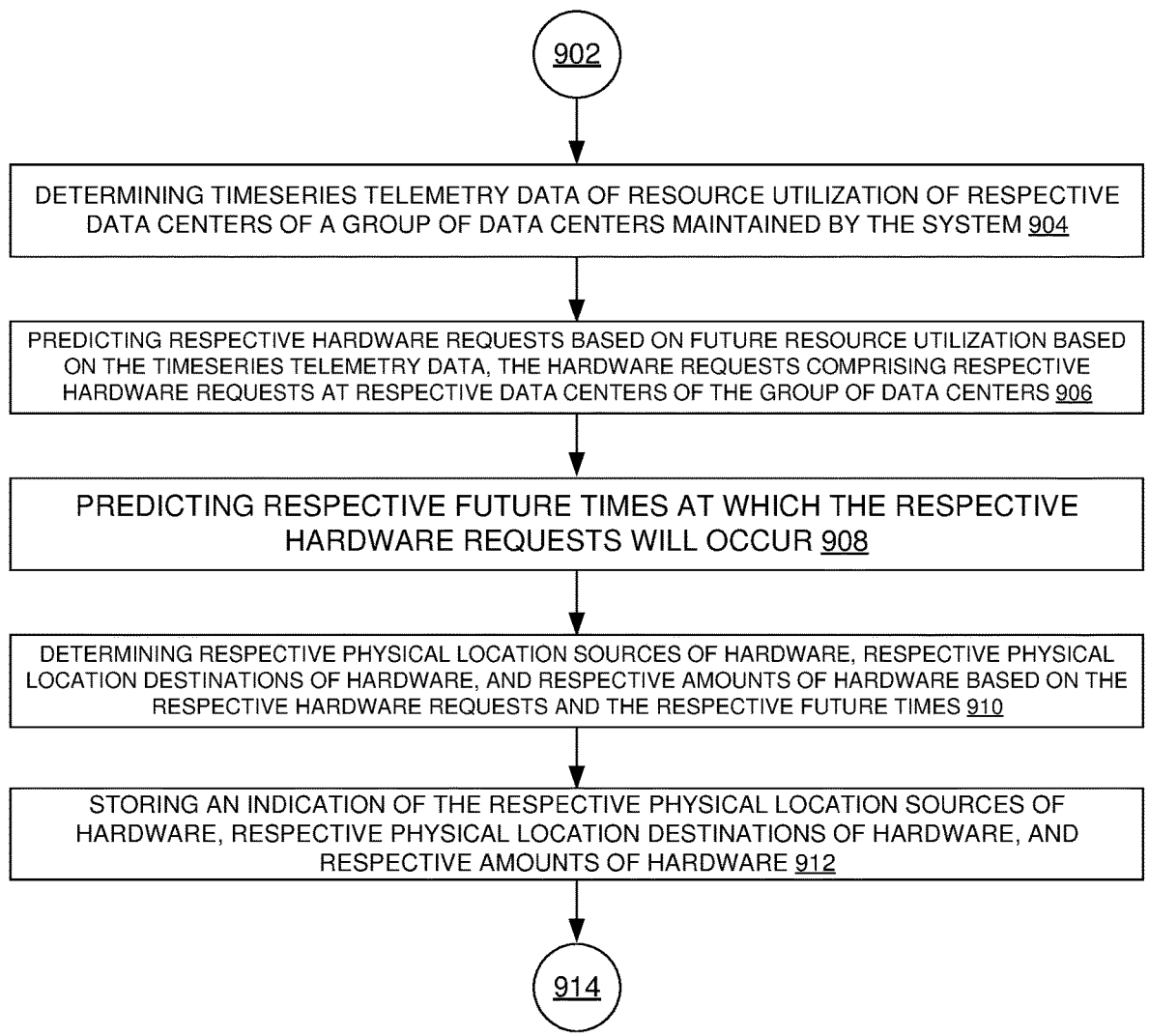
FIG. 9 illustrates an example process flow for global automated data center expansion, in accordance with an embodiment of this disclosure.

FIG. 9 illustrates an example process flow 900 for global automated data center expansion, in accordance with an embodiment of this disclosure. In some examples, one or more embodiments of process flow 900 can be implemented by resource determination among data centers component 104 of FIG. 1, resource determination among data centers component 204 of FIG. 2, resource determination among data centers component 604 of FIG. 6, or computing environment 1400 of FIG. 14.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, process flow 1100 of FIG. 11, process flow 1200 of FIG. 12, and/or process flow 1300 of FIG. 13.

Process flow 900 begins with 902, and moves to operation 904. Operation 904 depicts determining timeseries telemetry data of resource utilization of respective data centers of a group of data centers maintained by the system. That is, cloud management 602 of FIG. 6 can determine timeseries telemetry data for both data center 608A and data center 608B, using a component similar to telemetry component 526 of FIG. 5.

In some examples, the group of data centers comprises a first physical location that is exclusive to a first customer account, a second physical location that is exclusive to a second customer account, and a third physical location where workloads from the first customer account and the second customer account are able to operate concurrently. That is, the first physical location can be data center 608A of FIG. 6, the second physical location can be data center 608B, and the third physical location can be colocation site 624.

In some examples, a cloud platform manages first computers at the first physical location, second computers at the second physical location, and third computers at the third physical location. That is, the cloud platform can be cloud management 602 of FIG. 6.

In some examples, operation 904 comprises maintaining an overlay network that spans the first physical location and a portion of the third physical location, wherein virtualized workloads of the first customer account are configured to utilize the overlay network to operate at the first physical location or the second physical location without modification. This overlay network can be part of virtualization and overlay networking 512 of FIG. 5.

In some examples, operation 904 comprises maintaining a set of virtualized volumes that virtualize a first set of physical volumes at the first physical location and a second set of physical volumes at the third physical location, and wherein virtualized workloads of the first customer account are configured to utilize the set of virtualized volumes to operate at the first physical location or the third physical location. These virtualized volumes can be part of virtualization and overlay networking 512 of FIG. 5.

After operation 904, process flow 900 moves to operation 906.

Operation 906 depicts predicting respective hardware requests based on future resource utilization based on the timeseries telemetry data, the hardware requests comprising respective hardware requests at respective data centers of the group of data centers.

After operation 906, process flow 900 moves to operation 908.

Operation 908 depicts predicting respective future times at which the respective hardware requests will occur. That is, operations 906-908, cloud management 602 of FIG. 6 can use the timeseries telemetry data to produce a prediction similar to resource needs timeline 700 of FIG. 7, or resource needs table 800 of FIG. 8.

After operation 908, process flow 900 moves to operation 910.

Operation 910 depicts determining respective physical location sources of hardware, respective physical location destinations of hardware, and respective amounts of hardware based on the respective hardware requests and the respective future times. That is, based on these predictions, cloud management 602 of FIG. 6 can determine how and when to supply hardware to various locations, similar as described with respect to FIG. 8.

After operation 910, process flow 900 moves to operation 912.

Operation 912 depicts storing an indication of the respective physical location sources of hardware, respective physical location destinations of hardware, and respective amounts of hardware. This can be stored in a memory or storage of cloud management 602 of FIG. 6.

After operation 912, process flow 900 moves 914, where process flow ends.

Figure 10:
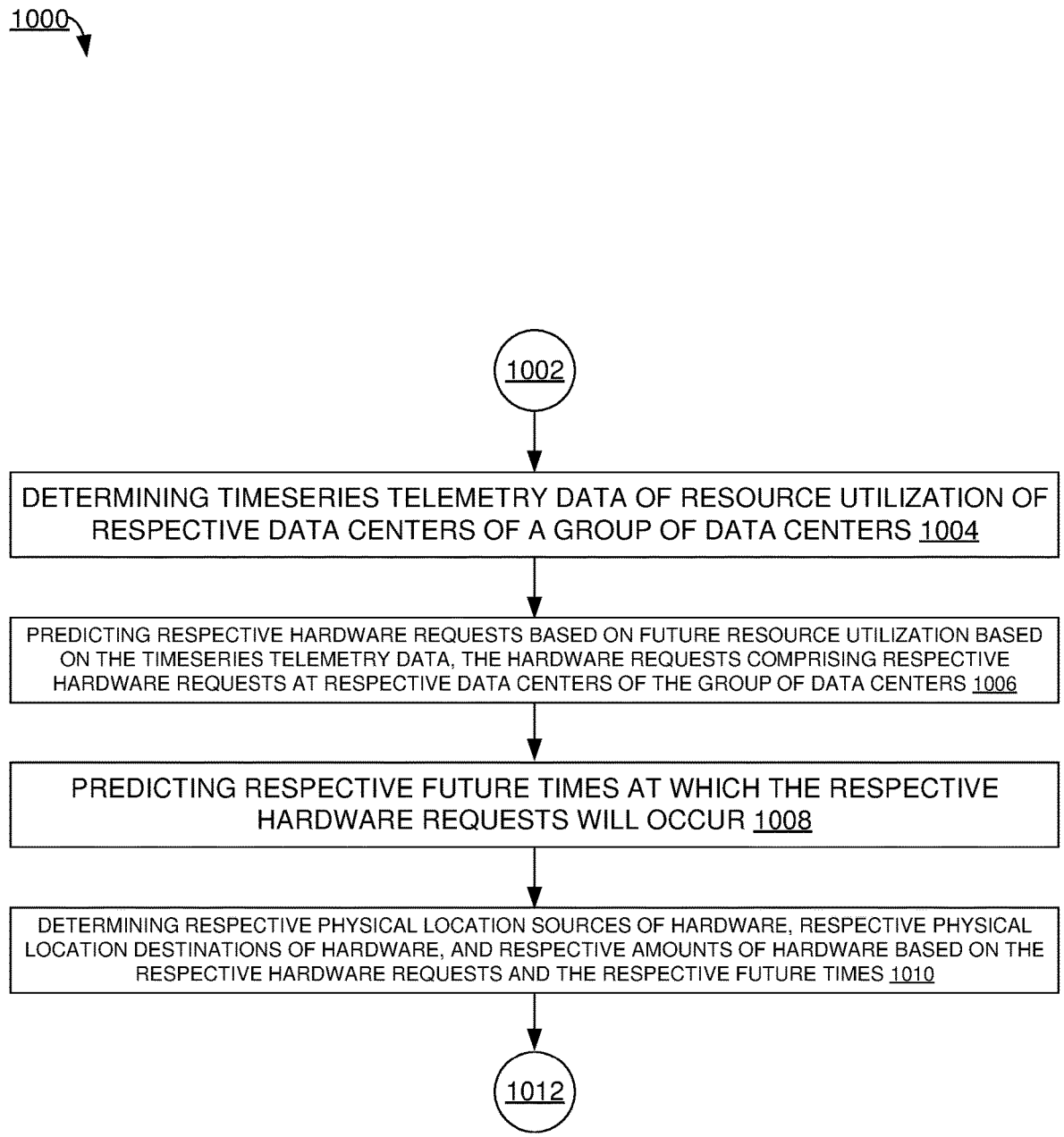
FIG. 10 illustrates another example process flow for global automated data center expansion, in accordance with an embodiment of this disclosure.

FIG. 10 illustrates another example process flow 1000 for global automated data center expansion, in accordance with an embodiment of this disclosure. In some examples, one or more embodiments of process flow 1000 can be implemented by resource determination among data centers component 104 of FIG. 1, resource determination among data centers component 204 of FIG. 2, resource determination among data centers component 604 of FIG. 6, or computing environment 1400 of FIG. 14.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, process flow 1100 of FIG. 11, process flow 1200 of FIG. 12, and/or process flow 1300 of FIG. 13.

Process flow 1000 begins with 1002, and moves to operation 1004. Operation 1004 depicts determining timeseries telemetry data of resource utilization of respective data centers of a group of data centers. In some examples, operation 1004 can be implemented in a similar manner as operation 904 of FIG. 9.

After operation 1004, process flow 1000 moves to operation 1006.

Operation 1006 depicts predicting respective hardware requests based on future resource utilization based on the timeseries telemetry data, the hardware requests comprising respective hardware requests at respective data centers of the group of data centers. In some examples, operation 1006 can be implemented in a similar manner as operation 906 of FIG. 9.

After operation 1006, process flow 1000 moves to operation 1008.

Operation 1008 depicts predicting respective future times at which the respective hardware requests will occur. In some examples, operation 1008 can be implemented in a similar manner as operation 908 of FIG. 9.

After operation 1008, process flow 1000 moves to operation 1010.

Operation 1010 depicts determining respective physical location sources of hardware, respective physical location destinations of hardware, and respective amounts of hardware based on the respective hardware requests and the respective future times. In some examples, operation 1010 can be implemented in a similar manner as operation 910 of FIG. 9.

In some examples, operation 1010 comprises applying an optimization to refine a score value while adhering to a constraint. This applying of an optimization can be performed in a similar manner as described with respect to FIG. 8.

In some examples, the score value comprises a cost of fulfilling the hardware requests with the hardware requests according to the respective physical location sources of hardware, the respective physical location destinations of hardware, and the respective amounts of hardware.

In some examples, the score value comprises a measurement of satisfying respective service level agreements for respective customer accounts that operate workloads on the group of data centers.

In some examples, the constraint comprises a delivery time for first hardware from a first physical location source of the respective physical location sources and to a first physical location destination of the respective physical location destinations.

In some examples, the constraint comprises a capacity of a first physical location destination of the respective physical location destinations to store and operate new hardware.

In some examples, the capacity of the first physical location destination of the respective physical location destinations to store and operate new hardware comprises an amount of available floor space of the first physical location destination, an amount of available rack space of the first physical location destination, an amount of electrical power available at the first physical location destination, or an amount of available cooling capacity at the first physical location destination.

In some examples, the constraint comprises a minimization of an amount of physical location destinations of the respective physical location destinations.

In some examples, the optimization technique comprises a greedy approach, an evolutionary approach, or use of a neural network model.

After operation 1010, process flow 1000 moves to 1012, where process flow 1000 ends.

FIG. 11 illustrates another example process flow 1100 for global automated data center expansion, in accordance with an embodiment of this disclosure. In some examples, one or more embodiments of process flow 1100 can be implemented by resource determination among data centers component 104 of FIG. 1, resource determination among data centers component 204 of FIG. 2, resource determination among data centers component 604 of FIG. 6, or computing environment 1400 of FIG. 14.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, process flow 1000 of FIG. 10, process flow 1200 of FIG. 12, and/or process flow 1300 of FIG. 13.

Process flow 1100 begins with 1102, and moves to operation 1104. Operation 1104 depicts determining resource utilization data for respective data centers of a group of data centers. In some examples, operation 1104 can be implemented in a similar manner as operation 904 of FIG. 9.

After operation 1104, process flow 1100 moves to operation 1106.

Operation 1106 depicts predicting respective hardware needs based on future resource utilization based on the resource utilization data, the hardware needs comprising respective hardware needs at respective data centers of the group of data centers. In some examples, operation 1106 can be implemented in a similar manner as operation 906 of FIG. 9.

After operation 1106, process flow 1100 moves to operation 1108.

Operation 1108 depicts predicting respective future times at which the respective hardware needs will occur based on the resource utilization data. In some examples, operation 1108 can be implemented in a similar manner as operation 908 of FIG. 9.

In some examples, operations 1104-1108 comprise repeatedly performing the determining of timeseries telemetry data, the predicting of respective hardware needs, and the predicting of respective future times. That is, the predictions can be constantly (or periodically) updated, and actions can be taken based on the latest predictions.

After operation 1108, process flow 1100 moves to operation 1110.

Operation 1110 depicts determining respective physical location sources of hardware, respective physical location destinations of hardware, and respective amounts of hardware based on the respective hardware needs and the respective future times. In some examples, operation 1110 can be implemented in a similar manner as operation 910 of FIG. 9.

In some examples, the determining in operation 1110 is based on respective decommission times to decommission installed hardware. In some examples, the respective decommission times comprise amounts of time to offload workloads from the installed hardware, clean up the installed hardware, or physically move the installed hardware. That is an amount of time that it takes to decommission hardware can factor into a decision of where to install new hardware, and the amount of time it takes to decommission hardware can be based on an amount of time it takes to perform various steps.

After operation 1110, process flow 1100 moves to 1112, where process flow 1100 ends.

Figure 12:
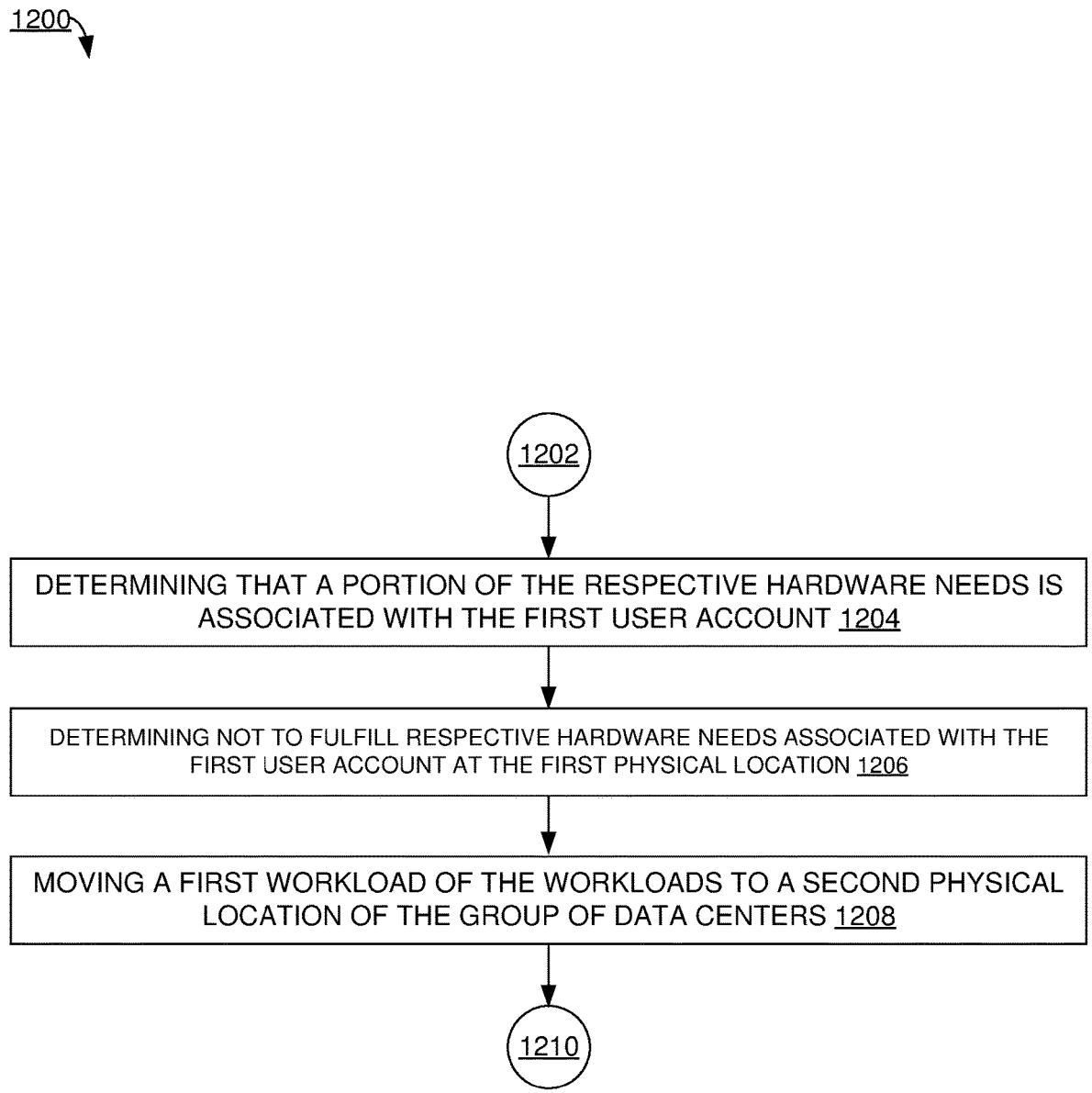
FIG. 12 illustrates an example process flow for identifying affinity workloads, and that can facilitate global automated data center expansion, in accordance with an embodiment of this disclosure.

FIG. 12 illustrates an example process flow 1200 for identifying affinity workloads, and that can facilitate global automated data center expansion, in accordance with an embodiment of this disclosure. In some examples, one or more embodiments of process flow 1200 can be implemented by resource determination among data centers component 104 of FIG. 1, resource determination among data centers component 204 of FIG. 2, resource determination among data centers component 604 of FIG. 6, or computing environment 1400 of FIG. 14.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 900 of FIG. 9, process flow 1000 of FIG. 10, process flow 1100 of FIG. 11, and/or process flow 1300 of FIG. 13.

Process flow 1200 begins with 1202, and moves to operation 1204. Operation 1204 depicts determining that a portion of the respective hardware needs is associated with the first user account. That is, a first user account can have workloads running, and there can be hardware needs to run those workloads (and to run a predicted increased amount of those workloads).

After operation 1204, process flow 1200 moves to operation 1206.

Operation 1206 depicts determining not to fulfill respective hardware needs associated with the first user account at the first physical location.

After operation 1206, process flow 1200 moves to operation 1208.

Operation 1208 depicts moving a first workload of the workloads to a second physical location of the group of data centers. That is, operations 1206-1208 can be implemented to determine how to address affinity workloads increasing. In some examples, rather than increasing an amount of hardware resources at a location where the workloads are operating, the workloads can be moved to another location. A reason for this can be that the workloads operate in a data center where there is not enough rack space to install new hardware sufficient to meet the predicted resource needs.

After operation 1208, process flow 1200 moves to 1210, where process flow 1200 ends.

Figure 13:
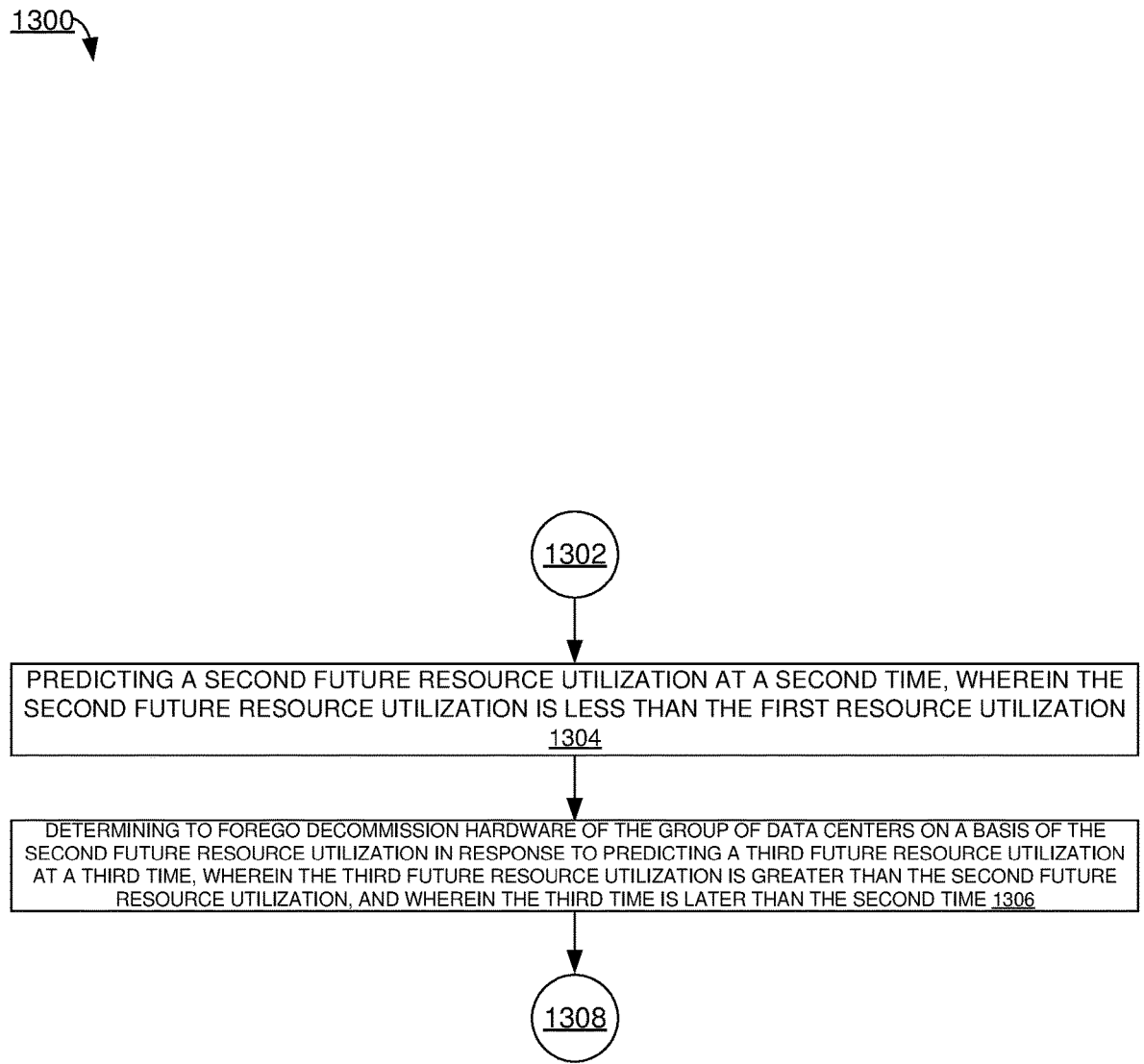
FIG. 13 illustrates an example process flow for determining whether to decommission hardware, and that can facilitate global automated data center expansion, in accordance with an embodiment of this disclosure.

FIG. 13 illustrates an example process flow 1300 for determining whether to decommission hardware, and that can facilitate global automated data center expansion, in accordance with an embodiment of this disclosure. In some examples, one or more embodiments of process flow 1300 can be implemented by resource determination among data centers component 104 of FIG. 1, resource determination among data centers component 204 of FIG. 2, resource determination among data centers component 604 of FIG. 6, or computing environment 1400 of FIG. 14.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of one or more of process flow 900 of FIG. 9, process flow 1000 of FIG. 10, process flow 1100 of FIG. 11, and/or process flow 1200 of FIG. 12.

Process flow 1300 begins with 1302, and moves to operation 1304. Operation 1304 depicts predicting a second future resource utilization at a second time, wherein the second future resource utilization is less than the first resource utilization. That is, it can be predicted that the amount of hardware resources needed will go down over time, such as from the examples of FIGS. 7-8.

After operation 1304, process flow 1300 moves to operation 1306.

Operation 1306 depicts determining to forego decommission hardware of the group of data centers on a basis of the second future resource utilization in response to predicting a third future resource utilization at a third time, wherein the third future resource utilization is greater than the second future resource utilization, and wherein the third time is later than the second time.

That is, it can be determined that the amount of hardware resources needed going down over time in operation 1304 will be temporary, and then the amount of hardware resources needed will rise. In this case, it can be determined not to decommission hardware based on the amount of hardware resources going down (predicted in operation 1304), since it is predicted that they would need to be recommissioned later.

After operation 1306, process flow 1300 moves to 1306, where process flow 1300 ends.

Example Operating Environment

In order to provide additional context for various embodiments described herein, FIG. 14 and the following discussion are intended to provide a brief, general description of a suitable computing environment 1400 in which the various embodiments of the embodiment described herein can be implemented.

For example, parts of computing environment 1400 can be used to implement one or more embodiments of cloud management 102, data centers 106, and/or data center 108 of FIG. 1, and/or cloud management 202, data centers 206, and/or data center 208 of FIG. 2.

In some examples, computing environment 1400 can implement one or more embodiments of the process flows of FIGS. 9-13 to facilitate global automated data center expansion.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a nonvolatile storage such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples, and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A system, comprising:
   at least one processor; and
   at least one memory that stores executable instructions that, when executed by the at least one processor, facilitate performance of operations, comprising:

determining timeseries telemetry data of resource utilization of respective data centers of a group of data centers maintained by the system;

predicting respective hardware requests based on future resource utilization based on the timeseries telemetry data, wherein the respective hardware requests indicate respective requests regarding an availability of hardware at the respective data centers of the group of data centers;

predicting respective future times at which the respective hardware requests will occur;

determining respective physical location sources of hardware that are able to be physically moved to respective physical location destinations of the hardware, the respective physical location destinations of hardware to which the hardware is able to be physically moved, and respective amounts of the hardware based on the respective hardware requests and the respective future times; and storing an indication of the respective physical location sources of the hardware, respective physical location destinations of the hardware, and respective amounts of the hardware.

2. The system of claim 1, wherein the group of data centers comprises a first physical location that is exclusive to a first customer account, a second physical location that is exclusive to a second customer account, and a third physical location where workloads from the first customer account and the second customer account are able to operate concurrently.

3. The system of claim 2, wherein the system further comprises a cloud platform manages first computers at the first physical location, second computers at the second physical location, and third computers at the third physical location.

4. The system of claim 2, wherein the operations further comprise:

maintaining an overlay network that spans the first physical location and a portion of the third physical location, wherein virtualized workloads of the first customer account are configured to utilize the overlay network to operate at the first physical location or the second physical location without modification.

5. The system of claim 2, wherein the operations further comprise:

maintaining a set of virtualized volumes that virtualize a first set of physical volumes at the first physical location and a second set of physical volumes at the third physical location, and wherein virtualized workloads of the first customer account are configured to utilize the set of virtualized volumes to operate at the first physical location or the third physical location.

6. A method, comprising:

determining, by a system comprising at least one processor, timeseries telemetry data of resource utilization of respective data centers of a group of data centers;

predicting, by the system, respective hardware requests at the respective data centers based on future resource utilization based on the timeseries telemetry data;

predicting, by the system, respective future times at which the respective hardware requests will occur; and determining, by the system, respective physical location sources of hardware that are able to be physically moved to respective physical location destinations of the hardware, the respective physical location destinations of hardware to which the hardware is able to be physically moved, and respective amounts of the hardware based on the respective hardware requests and the respective future times.

7. The method of claim 6, wherein the determining of the respective physical location sources of the hardware that are able to be physically moved to the respective physical location destinations of the hardware, the respective physical location destinations of hardware to which the hardware is able to be physically moved, and the respective amounts of the hardware comprises:

applying an optimization to refine a score value while adhering to at least one constraint.

8. The method of claim 7, wherein the score value comprises a cost of fulfilling the hardware requests according to the respective physical location sources of the hardware that are able to be physically moved to the respective physical location destinations of the hardware, the respective physical location destinations of hardware to which the hardware is able to be physically moved, and the respective amounts of the hardware.

9. The method of claim 7, wherein the score value comprises a measurement of satisfying respective service level agreements for respective customer accounts that operate workloads on the group of data centers.

10. The method of claim 7, wherein the at least one constraint comprises a delivery time for first hardware from a first physical location source of the respective physical location sources and to a first physical location destination of the respective physical location destinations.

11. The method of claim 7, wherein the at least one constraint comprises a capacity of a first physical location destination of the respective physical location destinations to store and operate new hardware.

12. The method of claim 11, wherein the capacity of the first physical location destination of the respective physical location destinations to store and operate new hardware comprises an amount of available floor space of the first physical location destination, an amount of available rack space of the first physical location destination, an amount of electrical power available at the first physical location destination, or an amount of available cooling capacity at the first physical location destination.

13. The method of claim 7, wherein the at least one constraint comprises a minimization of an amount of physical location destinations of the respective physical location destinations.

14. The method of claim 7, wherein the optimization comprises a greedy approach, an evolutionary approach, or use of a neural network model.

15. A non-transitory computer-readable medium comprising instructions that, in response to execution, cause a system comprising at least one processor to perform operations, comprising:

determining resource utilization data for respective data centers of a group of data centers;

predicting respective hardware needs at the respective data centers based on future resource utilization based on the resource utilization data;

predicting respective future times at which the respective hardware needs will occur based on the resource utilization data; and determining respective physical location sources of hardware that are able to be physically moved to respective physical location destinations of the hardware, the respective physical location destinations of hardware to which the hardware is able to be physically moved, and respective amounts of the hardware based on the respective hardware needs and the respective future times.

16. The non-transitory computer-readable medium of claim 15, wherein a first user account operates workloads at a first physical location of the group of data centers, and wherein the operations further comprise:
   determining that a portion of the respective hardware needs is associated with the first user account;
   determining not to fulfill the respective hardware needs associated with the first user account at the first physical location; and
   moving a first workload of the workloads to a second physical location of the group of data centers.

17. The non-transitory computer-readable medium of claim 15, wherein the future resource utilization is a first future resource utilization that occurs at a first time, wherein the operations further comprise:
   predicting a second future resource utilization at a second time, wherein the second future resource utilization is less than the first future resource utilization; and
   determining to forego decommissioning hardware of the group of data centers on a basis of the second future resource utilization in response to predicting a third future resource utilization at a third time, wherein the third future resource utilization is greater than the second future resource utilization, and wherein the third time is later than the second time.

18. The non-transitory computer-readable medium of claim 15, wherein the operations further comprise:
   repeatedly performing the determining of timeseries telemetry data, the predicting of the respective hardware needs, and the predicting of the respective future times.

19. The non-transitory computer-readable medium of claim 15, wherein the determining of the respective physical location sources of the hardware that are able to be physically moved to the respective physical location destinations of the hardware, the respective physical location destinations of the hardware to which the hardware is able to be physically moved, and the respective amounts of the hardware is based on respective decommission times to decommission installed hardware.

20. The non-transitory computer-readable medium of claim 19, wherein the respective decommission times comprise amounts of time to offload workloads from the installed hardware, clean up the installed hardware, or physically move the installed hardware.

\* \* \* \* \*